United States Patent [19]

Fantauzzo

[11] Patent Number: 5,451,077

[45] Date of Patent: Sep. 19, 1995

[54] AUTOMOTIVE VEHICLE WITH SAFETY BUMPER AND TWO-PIECE FRAME

[76] Inventor: Joseph Fantauzzo, 33 Peppermint Dr., Rochester, N.Y. 14615

[21] Appl. No.: 382,682

[22] Filed: Feb. 2, 1995

[51] Int. Cl.⁶ .............................................. B62D 21/15
[52] U.S. Cl. .................... 280/784; 180/274; 180/279; 293/135; 293/137
[58] Field of Search .............. 280/784, 781, 278, 287; 180/274, 279, 280, 232, 208; 293/137, 135, 132; 296/189

[56] References Cited

U.S. PATENT DOCUMENTS

| | | | |
|---|---|---|---|
| 1,800,142 | 4/1931 | Heagney | 180/280 |
| 2,102,120 | 12/1937 | Hevenor | 293/137 |
| 2,840,411 | 6/1958 | Mason | 293/125 |
| 3,532,351 | 10/1970 | Kaufman | 280/287 |
| 3,708,195 | 1/1973 | Kottsieper | 293/125 |
| 3,860,258 | 1/1975 | Feustel et al. | 280/784 |
| 4,826,209 | 5/1989 | Farris | 280/784 |
| 5,335,745 | 8/1994 | Goor | 280/784 |

FOREIGN PATENT DOCUMENTS

| | | | |
|---|---|---|---|
| 0566840A1 | 10/1993 | European Pat. Off. | 180/232 |
| 1504808 | 12/1967 | France | 180/274 |
| 2230233 | 1/1974 | Germany | 180/232 |
| 1354649 | 5/1974 | United Kingdom | 180/232 |
| 1063666 | 12/1983 | U.S.S.R. | 280/784 |
| 1159813 | 6/1985 | U.S.S.R. | 280/781 |

*Primary Examiner*—Margaret A. Focarino
*Assistant Examiner*—Peter C. English
*Attorney, Agent, or Firm*—Shlesinger, Fitzsimmons & Shlesinger

[57] ABSTRACT

The vehicle frame has a rear section carrying the engine and passenger bearing cab, and a front section carrying a resiliently mounted bumper. The two frame sections have confronting, overlapping end portions connected together for pivotal movement relative to each other about a vertical axis. A releasable locking pin is normally retained by a frangible detent in an operative position in which it prevents any pivotal movement of one frame section relative to the other. When the bumper collides with another vehicle, or the like, it drives a release pin against the locking pin thereby breaking the detent and releasing the locking pin while simultaneously causing the front frame section to be swung out of alignment with the rear frame section.

12 Claims, 3 Drawing Sheets

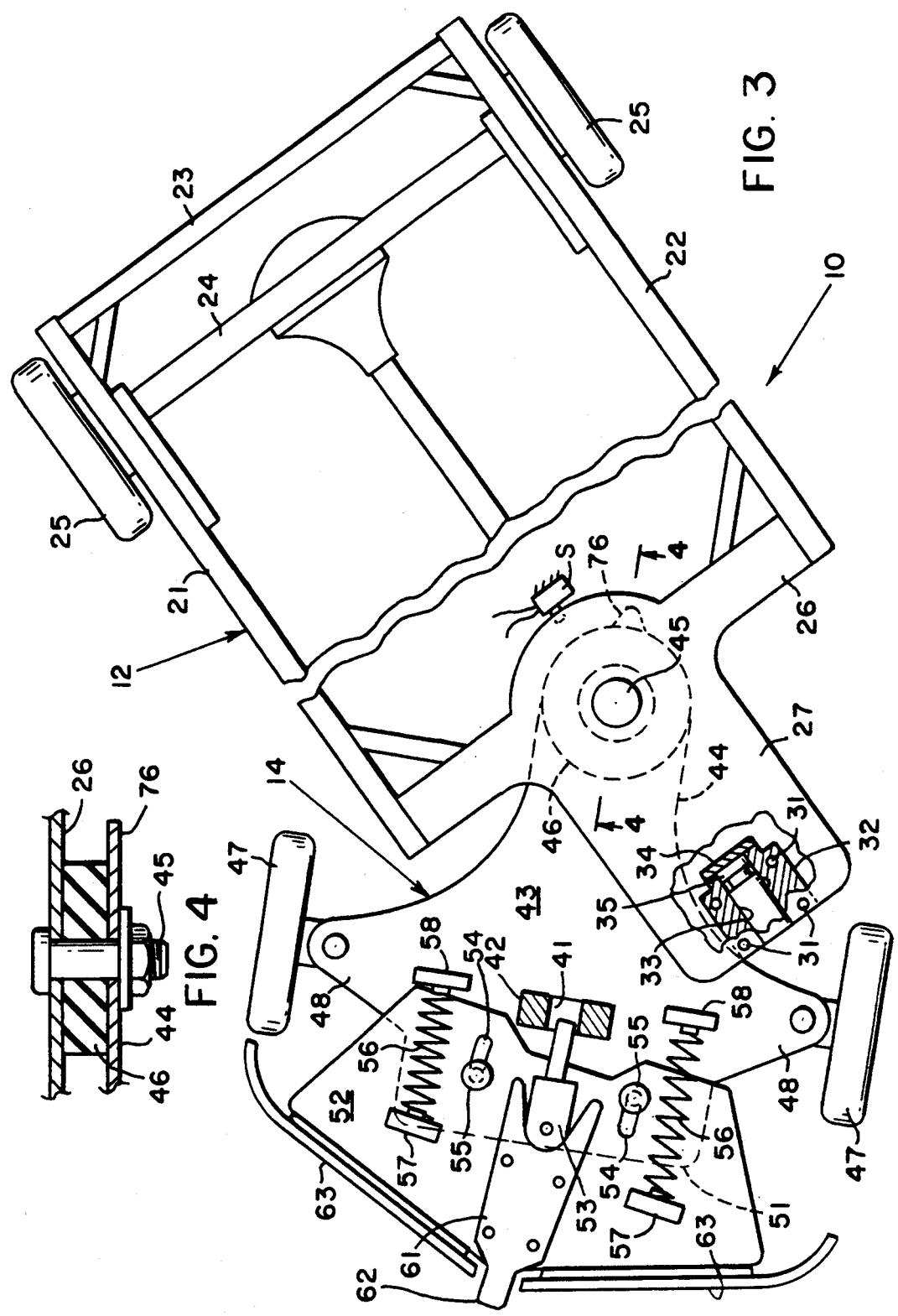

AUTOMOTIVE VEHICLE WITH SAFETY BUMPER AND TWO-PIECE FRAME

BACKGROUND OF THE INVENTION

This invention relates to automotive vehicles, and more particularly to an improved, safer automotive vehicle which is provided with a safety bumper and a two-piece frame. Even more particularly, this invention relates to an automotive vehicle having a novel, two-piece frame comprising a rear or cab section for supporting the vehicle's engine and occupants, and a forward, bumper supporting section pivotally connected to the rear section, and designed to be swung slightly out of alignment with the cab section upon collision of the bumper with another vehicle or object.

Since its infancy, the automotive industry has consistently attempted to improve upon the safety afforded to the occupants of an automotive vehicle during an unexpected collision or accident. In addition to a variety of safety devices which have been incorporated into the cab section of a vehicle—i.e., the section which supports and encloses the occupants of the vehicle—improved structural features have been incorporated in the remainder of the vehicle frame in order to reduce the shock or the impact which the occupants must absorb during an accidental collision with another vehicle, or the like.

U.S. Pat. No. 3,860,258, for example, discloses an energy absorbing frame and associated bumper, which are designed to telescope slightly upon impact, thereby to absorb much of the shock which would otherwise be transmitted to the occupants of the vehicle. U.S. Pat. No. 5,335,745 and the German publication 2,230,233, on the other hand, disclose automotive frames which are designed to support the vehicle motor in such manner that upon impact the motor will be directed downwardly or away from the occupants of the vehicle during a front-end collision of one vehicle with another. The U.S. Pat. Nos. 2,840,411 and 3,708,195, on the other hand, disclose modified bumper mechanisms which, in essence, are designed to cause the entire vehicle, upon impact with another vehicle, to be deflected laterally by the bumper to avoid head-on impact, or to absorb the shock of the impact.

One of the main disadvantages of prior such alleged safety devices is the fact that the devices are designed simply to absorb shock, or to cause the entire vehicle to be deflected slightly laterally upon head-on impact. In addition to absorbing shock, of course, some such frames are also designed to deflect the entire motor mount away from the passenger cab, in the event that a head-on collision would otherwise tend to drive the motor rearwardly into the passenger compartment. One of the major disadvantages of such prior art devices, however, is that they simply do not provide any means for, in effect, eliminating the major shock or impact of an accident, but merely attempt to absorb such impact.

It is an object of this invention, therefore, to provide an improved automotive vehicle frame and associated bumper mechanism which functions during an accident or collision of the vehicle to prevent any sudden shock or impact to be transmitted to the occupants of the vehicle.

A more specific object of this invention is to provide an improved vehicle frame of the type described which is designed to have a bumper bearing section of the vehicle pivotally connected to the engine and passenger bearing section of the vehicle, so that upon a head-on collision, or nearly head-on collision of the vehicle with another vehicle or object, the bumper bearing section of the vehicle will automatically be swung slightly out of alignment with the engine and passenger bearing section, thereby preventing any excessive impact or shock from being imparted to the passenger section of the vehicle.

Other objects of the invention will be apparent hereinafter from the specification and from the recital of the appended claims, particularly when read in conjunction with the accompanying drawings.

SUMMARY OF THE INVENTION

The vehicle frame comprises an elongate, rear, engine and passenger supporting section that is supported adjacent its rear end in a conventional manner on the two rear wheels of the vehicle, and a front, bumper supporting section privotally connected adjacent its rear end to the forward end of the rear, engine/passenger supporting section, and supported adjacent its forward end on the two front wheels of the vehicle. A lock pin is slidably mounted at one end in a housing fixed to the forward end of the rear frame section, and normally extends slidably into a registering opening in another housing fixed to the rear end of the front frame section. The stop pin, which is normally fixed by a frangible pin against sliding movement in the stop pin housings, normally retains the front frame section in alignment with the rear frame section, and prevents any pivotal movement of one section relative to the other.

When the bumper carried by the front frame section collides with another vehicle, or the like, it is moved slightly rearwardly relative to the front frame section and in so doing drives a release pin against the front end of the lock pin, causing the latter to be driven out of the pin housing carried by the front frame section, and simultaneously causing the front section to be swung out of alignment with the rear, passenger bearing section of the frame, thereby preventing any shock or impact loading to be transmitted directly to the passengers.

THE DRAWINGS

Figure 2:
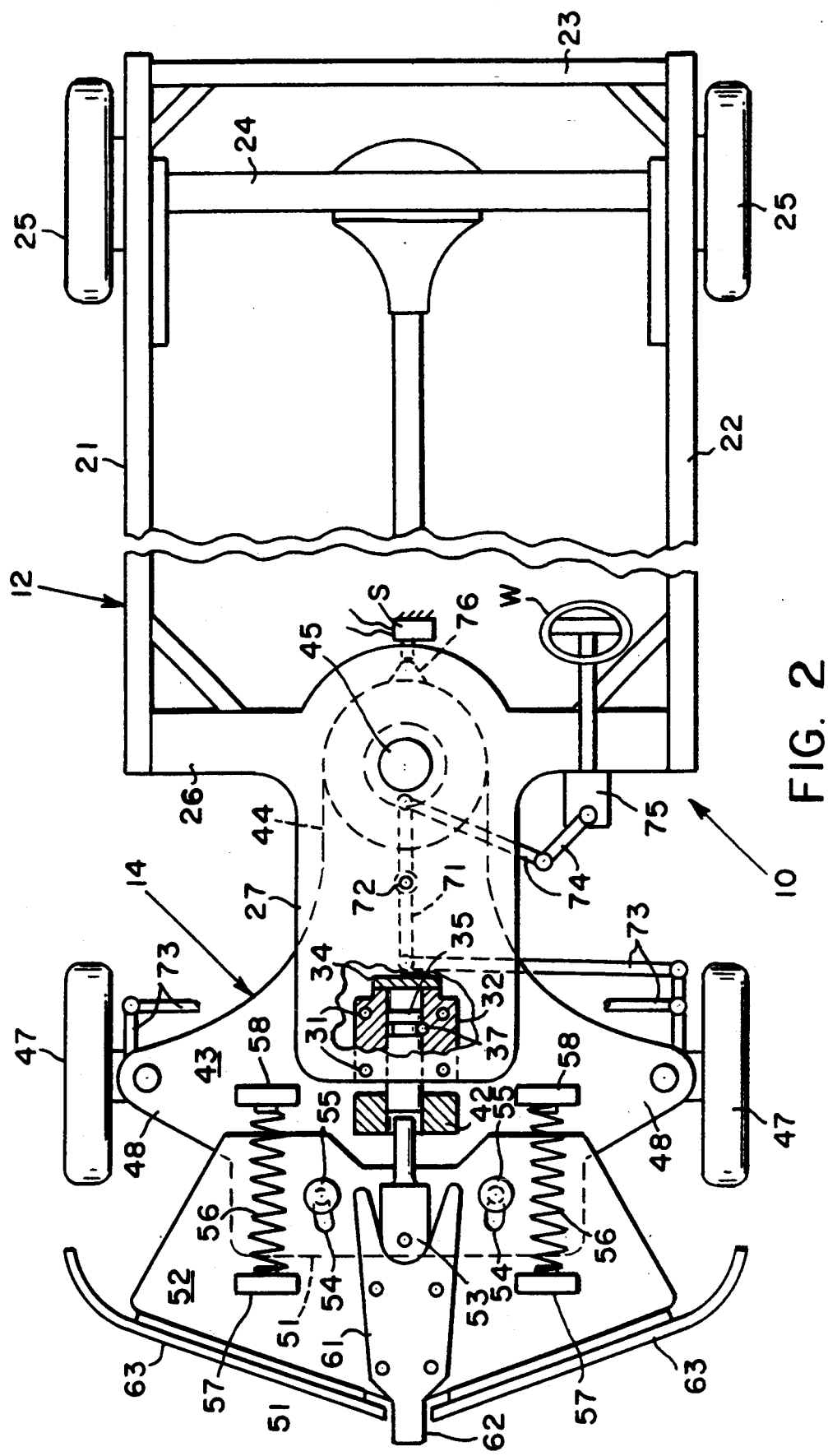
FIG. 2 is a fragmentary sectional view taken generally along the line 2—2 in FIG. 1 looking in the direction of the arrows, portions of the vehicle again being broken away and shown in section, and with the forward and rear sections of the two-piece frame being shown in their normal, aligned positions.

FIG. 3 is a fragmentary sectional view generally similar to that shown in FIG. 2, but illustrating the manner in which the front portion of the two-piece frame is disposed to be displaced angularly relative to the rear section of the frame upon impact of the front bumper of the frame with another vehicle or object; and FIG. 4 is an enlarged fragmentary sectional view taken generally along the line 4—4 in FIG. 3 looking in the direction of the arrows.

DETAILED DESCRIPTION OF THE PREFERRED EMBODIMENTS:

Referring now to the drawings by numerals of reference, 10 denotes generally an automotive vehicle, such as an automobile, having a novel, two-piece frame comprising a rear or cab section which is denoted generally by the numeral 12, and a front, bumper supporting section denoted generally by the numeral 14. As noted hereinafter, front section 14 is pivotally connected to the rear section 12 in such manner that a detent mechanism normally retains the two sections 12 and 14 in alignment with each other, as shown for example in FIGS. 1 and 2. However, in the event that the vehicle collides head-on with another vehicle, or with a stationary object, the two sections of the frame are caused to pivot one relative to the other, so that the engine and passenger bearing section 12 is caused to be swung out of alignment with the front section (either to the right or to the left thereof), thereby substantially eliminating or avoiding any major shock loading or impact from being imparted to the passengers supported in the cab section of the vehicle.

Figure 1:
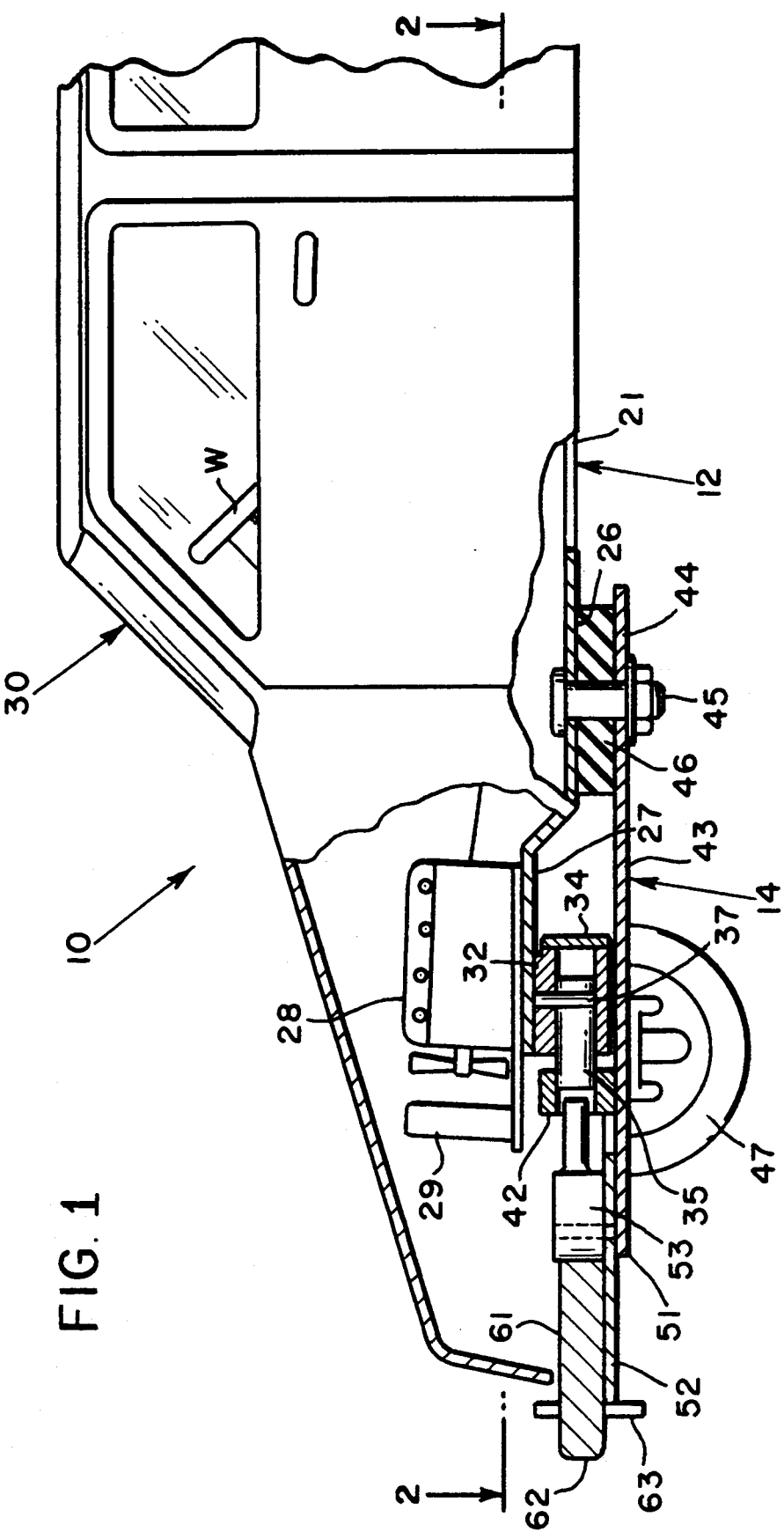
FIG. 1 is a fragmentary side elevational view of an automotive vehicle made in accordance with one embodiment of this invention, portions of the automobile frame being broken away and shown in section.

As shown more clearly in FIGS. 2 and 3 of the drawings, frame section 12 comprises a pair of spaced, rigid, side frame members 21 and 22, which are secured in spaced relation at their rear ends (the right ends in FIG. 2) by a transversely extending beam 23. Also extending transversely between frame members 21 and 22 adjacent their rear ends is a conventional axle 24 having mounted in the usual manner at the outer ends thereof the rear wheels 25 of the vehicle. As shown in FIG. 1, the rear frame section 12 supports thereon in a conventional manner the vehicle's cab or passenger supporting section, which is denoted generally by the numeral 30. This passenger supporting section 30 may be of conventional design, and since it forms no part of the invention it will not be described in greater detail herein.

Secured between the forward or left ends of the frame members 21 and 22, and extending transversely therebetween is a rigid beam 26 having formed thereon intermediate its ends a generally tongue-shaped, engine supporting platform 27, which projects forwardly of the beam 26 medially of its ends. As shown more clearly in FIG. 1, platform 27 is adapted to have mounted thereon in any conventional manner, the usual automotive engine 28 and its associated radiator 29. Since the manner in which the engine 28 and its associated parts are mounted on the forward end of frame section 12 forms no part of this invention, they will not be described in greater detail herein.

Releasably secured by a plurality of screws 31 to the underside of the platform 27 adjacent its forward end is a lock pin housing 32 having therein an axial bore 33 (FIG. 3), which is open at one end (its left end in FIGS. 1 and 2), and which is closed at its opposite end by an integral end cap 34. Coaxially and slidably mounted at one end thereof in the bore 33 of housing 32 is a cylindrical locking pin 35. Normally locking pin 35 is releasably held in the position as shown in FIGS. 1 and 2 by a frangible, or soft metal shear pin 37, one diametral side of which is seated in an arcuate recess in the wall of the housing bore 33, and the diametrally opposite side of which projects into an annular groove formed in locking pin 35 adjacent its inner end—i.e., the end confronting upon the end cap 34. As shown in FIGS. 1 and 2, the frangible detent 37 normally retains pin 35 in a position in which its inner end is axially spaced slightly from the bottom of the end cap 34, and so that a portion thereof at its opposite end projects axially out of the open end of housing 32 and, under normal operating conditions, extends into a registering bore 41 (FIG. 3) formed in a second lock pin housing 42, which is secured on the upper surface of a large, generally planar platform 43 that is located beneath platform 27.

Platform 43, which forms the principle part of the front frame section 14, has a rearwardly projecting central tongue or lug section 44, which extends rearwardly beneath the beam 26 of section 12, and which is pivotally connected thereto by a bolt 45 for pivotal movement relative to the frame section 12 about a vertical axis. Pivotal movement of the platform 43 relative to the rear frame section 12 is resisted by virtue of an annular friction pad 46, which surrounds the bolt 45 between lug section 44 of platform 43 and beam 26 of the rear frame section 12 for a purpose hereinafter. The two front wheels 47 of the vehicle are mounted in a conventional manner on the outer ends of lugs 48, which are integral with and project from opposite sides of the platform 43 adjacent the end thereof remote from its lug section 44. The wheels 47 are adapted to be connected to the vehicle's steering wheel W (FIGS. 1 and 2) in a manner noted hereinafter.

Platform 43 also includes an integral, generally rectangularly shaped nose section 51, which projects centrally from the forward or left end of platform 43, and beyond its laterally projecting lugs 48. Mounted for limited sliding movement on the nose section 51 of the platform 43 is a bumper supporting plate 52 having secured on its upper surface, and centrally thereof, a release pin 53. Pin 53 has a reduced-diameter shank that normally extends into the front end of the bore in the lock pin housing 42 in spaced, confronting relation to the lock pin 35. Adjacent opposite sides of its release pin 53 the plate 52 has therein a pair of spaced, parallel slots 54, which extend parallel to the axis of the release pin 53. Plate 52 is slidably connected to the underlying platform 43 by a pair of pins 55 which are secured to and project upwardly from the platform 43 and slidably through the slots 54, and which have thereon large-diameter heads that overlie by the slots 54. A pair of spaced, parallel compression springs 56, which are positioned outwardly from and parallel to the slots 54, are fixed at one end as at 57 to the plate 52, and at their opposite ends as at 58 to the platform 43. The springs 56 thus normally retain the bumper plate 52 resiliently in its advanced position relative to the platform 43, in which position the right hand ends of the slots 54, as shown in FIG. 2, are engaged with the pins 55.

Also secured in the upper surface of the bumper plate 52, and forwardly of the release pin 53, is a nose plate 61 having a forked end flanking the release pin 53, and a rounded nose section 62 which extends centrally of and beyond a pair of generally conventionally shaped bumpers 63 which are carried on the forward edge of the support plate 52.

While the steering linkage may be of generally conventional design, it is preferred that the linkage be mounted in such manner that steering of the front wheels 47 either to the right or to the left is imparted by a steering lever 71 (FIG. 2), which is mounted intermediate its ends to pivot beneath platform 43 about a vertical pin 72, which is fixed in platform 27 substantially centrally thereof. Lever 71 is connected at one end by the linkages 73 to the two front wheels, and at its opposite end via linkage 74 and the steering box 75 to the vehicle's steering wheel W. The purpose of this construction is to bring the steering pivot 72 close to the pin 45 which pivotally connects together the rear and front frame sections 12 and 14, respectively. This minimizes any movement which would otherwise be transmitted rearwardly through the steering mechanism to the steering wheel W, when the front section 14 of the frame is caused, as a result of an accident, to be swung or pivoted out of alignment with the rear section 12 of the frame.

Also as shown in FIGS. 2 and 3, the rearwardly projecting lug 44 on the platform 43 has formed on its extreme right-hand end as shown in FIG. 2, a dimple or projection 76 which normally is engaged with and closes the contact of a switch S which is connected in series circuit with the vehicle's ignition system. As noted hereinafter, if switch S is allowed to open, the power to the vehicle's electrical circuits will be interrupted.

As noted above, when the sections 12 and 14 of the frame are in the positions as shown in FIG. 1, switch S is closed, and the forward or left end of the stop pin 35 projects into the bore of housing 42 therefore effectively coupling the platform section 27 of the frame section 12 to the platform section 43 of the front frame section 14, and as thus coupled, it is not possible for the platform 43 of section 14 to be swung or pivoted about the pin 45 relative to the rear frame section 12. On the other hand, whenever the front end of the vehicle—namely, either bumper section 63 or the nose 62 strikes another vehicle, or a stationary object, the entire bumper supporting plate 52 will be urged rearwardly against the resistance of the springs 56, at least to the extent permitted by the slots 54. During this movement the support plate 52 is guided by the pin and slot connection (55, 54) rearwardly, and depending upon the intensity of the collision, the reduced-diameter end of the release pin 53 will strike the lock pin 35. If the force imparted by pin 53 to the pin 35 is sufficient, the detent or shear pin 37 will be sheared and the stop pin 35 will be forced rearwardly so that it becomes fully seated in the housing 32 (see FIG. 3), thereby disengaging the housing 42, and permitting the front frame section 14 (the platform 43 and the attached bumper support plate 52) to be swung as a unit about the axis of pin 45, and into, for example, the position shown in FIG. 3, wherein the passenger bearing frame section 12 of the vehicle is no longer in alignment with the front section 14. As a result, the impact of the collision, which might otherwise be imparted directly to the occupants of the vehicle, will be deflected away from the occupants of the vehicle.

During the pivotal movement of the front section 14 of the frame relative to its rear section 12, it is important to note that the friction clutch member 46, which is interposed between the beam 26 and lug section 44, will prevent any sudden angular movement of the section 12 relative to the section 14, thereby cushioning any shock which might otherwise be imparted to the passengers of the vehicle because of any sudden swinging movement of one section 12 or 14 of the vehicle frame relative to the other. Also, of course, at this time the detent or nose 76 will be swung out of engagement with the contact of switch S, as shown for example in FIG. 3, so that the ignition circuit will be automaticaly opened. Normally upon release of the lock pin 35 the rear section 12 of the two-piece frame will be swung approximately 45o relative to the front section 14 thereof, at which time the side members of the frame section 12 will be nearly parallel to one of the two bumper sections 63 on the vehicle. In so doing the entire motor section and the passenger section of the vehicle is swung out of alignment with the vehicle or stationary object which was struck, thereby considerably reducing any hazard which might otherwise be imparted to the occupants of the vehicle if, for example, the engine section of the vehicle were to be maintained in direct alignment with the front section 14 of the frame.

From the foregoing it will be apparent that the present invention is capable of still further modification, and that this application is intended to cover any such modifications which may fall within the scope of one skilled in the art, or the appended claims.

Once the shear pin detent 37 has been destroyed as the result of an accident, the two-piece frame (12, 14) may be restored to its normal mode by replacing housings 32 and 42 together with a new stop pin 35 and shear pin 37.

I claim:

1. In an automotive vehicle of the type having front and rear sets of wheels rotatable, respectively, about spaced, parallel axes for supporting the front and rear ends, respectively, of the vehicle, an improved vehicle frame, comprising a rear frame section supported adjacent one end thereof by said rear set of wheels of the vehicle, and having thereon a passenger supporting cab section extending forwardly toward the opposite end of said rear frame section, a front frame section supported adjacent one end thereof by said front set of wheels of the vehicle, and having thereon a bumper supporting section extending beyond said one end of said front frame section, and means connecting the opposite end of said front frame section in overlapping relation with said opposite end of said rear frame section, and for pivotal movement of one of said frame sections relative to the other about an axis extending normal to the axes of rotation of said wheels, said connecting means including releasable locking means interposed between said frame sections normally to prevent pivotal movement of said frame sections relative to each other about said axis and to retain said front frame section operatively aligned with said rear frame section, and said bumper supporting section being operative, upon the collision thereof with another vehicle or object, to effect release of said locking means and pivotal movement of said frame sections relative to each other about said axis whenever the force of said collision exceeds a predetermined amount.

2. In an automotive vehicle as defined in claim 1, wherein said locking means comprises, a first locking pin housing secured to said rear frame section adjacent said opposite end thereof, a second locking pin housing secured to said front frame section adjacent said opposite end thereof, and normally disposed in spaced, confronting relation to said first housing, a locking pin slidably mounted at opposite ends thereof in registering bores formed in the confronting surfaces of said housings, and a frangible detent interposed between said locking pin and one of said housings and operative normally to secure said locking pin against axial movement in said housings, and in an operative position in which said pin extends between said housings to maintain said front frame section aligned with said rear frame section.

3. In an automotive vehicle as defined in claim 2, including means interposed between said bumper supporting section and said locking pin, and operative, when the force of said collision exceeds said predetermined amount, to effect the breakage of said frangible detent and the shifting of said pin axially out of one of said two housings.

4. In an automotive vehicle as defined in claim 2, including
  means mounting said bumper supporting section on said front frame section for limited movement relative thereto between first and second limit positions, respectively,
  spring means interposed between said bumper supporting section and said front frame section and operative normally to retain said bumper supporting section resiliently in one of said two limit positions thereof, and
  means on said bumper supporting section operative to effect the breakage of said frangible detent, and to shift said locking pin axially out of one of said housings, when said bumper supporting section is shifted to the other of said two limit positions thereof.

5. In an automotive vehicle as defined in claim 1, wherein said connecting means includes friction means interposed between said front and rear frame sections, and operative frictionally to resist pivotal movement of said frame sections relative to each other about said axis upon release of said locking means.

6. In an automotive vehicle as defined in claim 1, including
  a safety switch mounted on one of said frame sections and disposed to be connected in series with the ignition circuit of said vehicle, and
  a switch operating lug formed on the other of said frame sections normally to engage and close said safety switch, and disposed to be swung out of engagement with said switch upon pivotal movement of said frame sections relative to each other.

7. A two-piece automotive vehicle frame, comprsing
  a first frame section disposed to be supported adjacent one end thereof on the rear wheels of a vehicle, and disposed to have mounted thereon adjacent said one end thereof a cab section for enclosing the occupants of a vehicle, and adjacent the opposite end thereof an engine for driving the vehicle,
  a second frame section extending at one end thereof in overlapping relation with said opposite end of said first frame section, and disposed to be supported at its opposite end on the front wheels of a vehicle,
  means connecting together the overlapping ends of said frame sections for pivotal movement relative to each other about a vertical axis,
  releasable locking means interposed between said frame sections and operative normally to prevent pivotal movement of said frame sections relative to each other and to retain said frame sections in operative alignment with each other, and
  bumper means resiliently mounted on said second frame section adjacent said opposite end thereof, and operative upon collision thereof with a vehicle or object to effect release of said locking means and consequent pivotal movement of said frame sections relative to each other whenever the force of said collision exceeds a predetermined amount.

8. A two-piece vehicle frame as defined in claim 7, wherein said connecting means includes friction means interposed between said overlapping ends of said frame sections and operative to resist pivotal movement of said frame sections relative to each other upon release of said locking means.

9. A two-piece vehicle frame as defined in claim 7, wherein said releasable locking means comprises
  a locking pin normally disposed in a locking position in which it projects at one end slidably into a bore in a fixture carried by said first frame section, and at its opposite end slidably into a bore in a fixture carried by said second frame section, and
  a frangible detent interposed between said locking pin and one of said fixtures and operative normally to retain said locking pin in said locking position.

10. A two-piece vehicle frame as defined in claim 9, said bumper means being operative upon the collision thereof with another vehicle or object to break said frangible detent and shift said locking pin out of one of said bores whenever the force of said collision exceeds a predetermined amount.

11. A two-piece automotive vehicle frame comprising
  a first frame section disposed to be supported adjacent one end thereof on the rear wheels of a vehicle, and disposed to have mounted thereof adjacent said one end thereof a cab section for enclosing the occupants of a vehicle, and adjacent the opposite end thereof an engine for driving the vehicle,
  a second frame section extending at one end thereof beneath and in overlapping relation with said opposite end of said first frame section, and disposed to be supported at its opposite end on the front wheels of a vehicle,
  means connecting together the overlapping ends of said frame sections for pivotal movement relative to each other about a vertical axis,
  releasable locking means interposed between said frame sections and operative normally to prevent pivotal movement of said frame sections relative to each other and to retain said frame sections in operative alignment with each other,
  a bumper section resiliently mounted on said second frame section for limited movement between a first limit position in which said bumper section projects forwardly a predetermined distance beyond said opposite end of said second frame section, and a second limit position in which said bumper section is shifted said predetermined distance rearwardly on said second frame section upon collision of said bumper section with another vehicle or object, and
  means responsive to the movement of said section to said second limit position to effect release of said locking means, and the pivotal movement of said frame sections relative to each other.

12. A two-piece vehicle frame as defined in claim 1, including spring means interposed between said bumper section and said second frame section and operative resiliently to urge said bumper section into said first limit position.

* * * * *